(12) United States Patent
Fujimori

(10) Patent No.: US 12,256,178 B2
(45) Date of Patent: Mar. 18, 2025

(54) IMAGE PROCESSING DEVICE, MOVING DEVICE, IMAGE PROCESSING METHOD, AND STORAGE MEDIUM

(71) Applicant: CANON KABUSHIKI KAISHA, Tokyo (JP)

(72) Inventor: Soya Fujimori, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 167 days.

(21) Appl. No.: 17/970,646

(22) Filed: Oct. 21, 2022

(65) Prior Publication Data

US 2023/0134184 A1    May 4, 2023

(30) Foreign Application Priority Data

Oct. 29, 2021    (JP) ................. 2021-177410

(51) Int. Cl.
*H04N 7/18*        (2006.01)
*G06T 5/70*        (2024.01)
(Continued)

(52) U.S. Cl.
CPC .............. *H04N 7/183* (2013.01); *G06T 5/70* (2024.01); *G06V 20/584* (2022.01); *H04N 23/61* (2023.01); *G06T 2207/30261* (2013.01)

(58) Field of Classification Search
CPC .......... H04N 7/183; H04N 23/61; G06T 5/70; G06T 2207/30261
See application file for complete search history.

(56) References Cited

U.S. PATENT DOCUMENTS

2018/0376122 A1\* 12/2018 Park ................. H04N 13/296
2020/0137371 A1\* 4/2020 Adachi ............. H04N 13/282
(Continued)

FOREIGN PATENT DOCUMENTS

CN    103770708 A  \*  5/2014  ............. B60R 1/00
JP    2004272578 A  \*  9/2004
(Continued)

OTHER PUBLICATIONS

Office Action issued on Jun. 4, 2024, in corresponding Japanese Patent Application No. 2021-177410, with English translation (10 pages).

*Primary Examiner* — Rowina J Cattungal
(74) *Attorney, Agent, or Firm* — Venable LLP

(57) ABSTRACT

An image processing device includes an imaging unit having an optical system forming an optical image, including low-distortion and high-distortion regions on a light receiving surface, and to image a side behind a first moving device, an image processing unit to generate image data by distortion correcting image data generated by the imaging unit, a detection unit to detect a second moving device that satisfies a predetermined condition from the image data corresponding to a region including the high-distortion region, and a display control unit to display narrow angle image data corresponding to the low-distortion region in the image data when the detection unit does not detect the second moving device, and to display wide angle image data corresponding to the low-distortion region and the high-distortion region when the detection unit detects the second moving device, to display the wide angle image date including the second moving device.

15 Claims, 9 Drawing Sheets

(51) Int. Cl.
  *G06V 20/58* (2022.01)
  *H04N 23/61* (2023.01)

(56) References Cited

U.S. PATENT DOCUMENTS

| | | | |
|---|---|---|---|
| 2020/0167114 A1* | 5/2020 | Hayashida | G06F 3/14 |
| 2021/0029056 A1 | 1/2021 | Lawrence, III | |
| 2021/0179096 A1* | 6/2021 | Shalev-Shwartz | B60W 60/00272 |
| 2021/0306551 A1* | 9/2021 | Okabe | B60R 1/28 |

FOREIGN PATENT DOCUMENTS

| | | |
|---|---|---|
| JP | 2014235639 A | 12/2014 |
| JP | 2018-74558 A | 5/2018 |
| JP | 2019178871 A | 10/2019 |
| WO | 2017068692 A | 4/2017 |
| WO | 2019123840 A | 6/2019 |
| WO | 2020110611 A | 6/2020 |
| WO | 2021145367 A | 7/2021 |

* cited by examiner

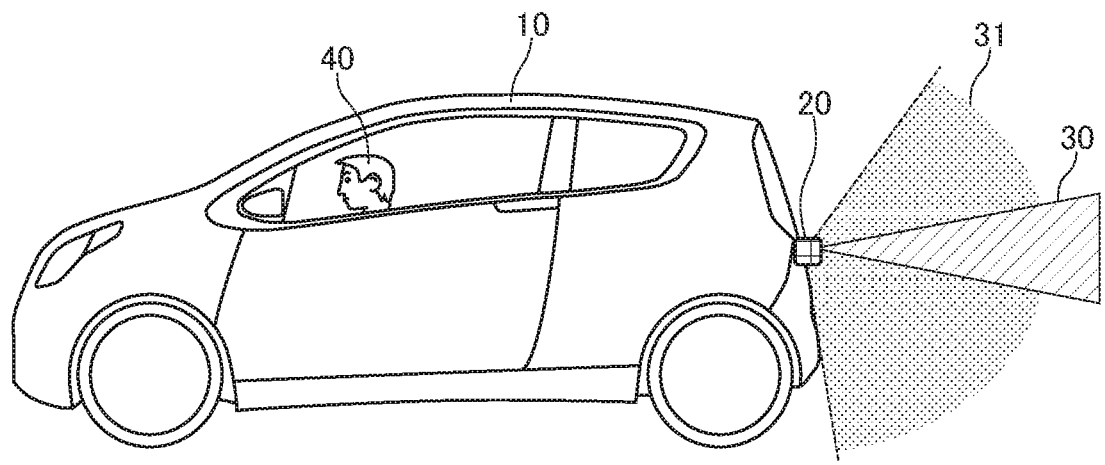
FIG. 1A
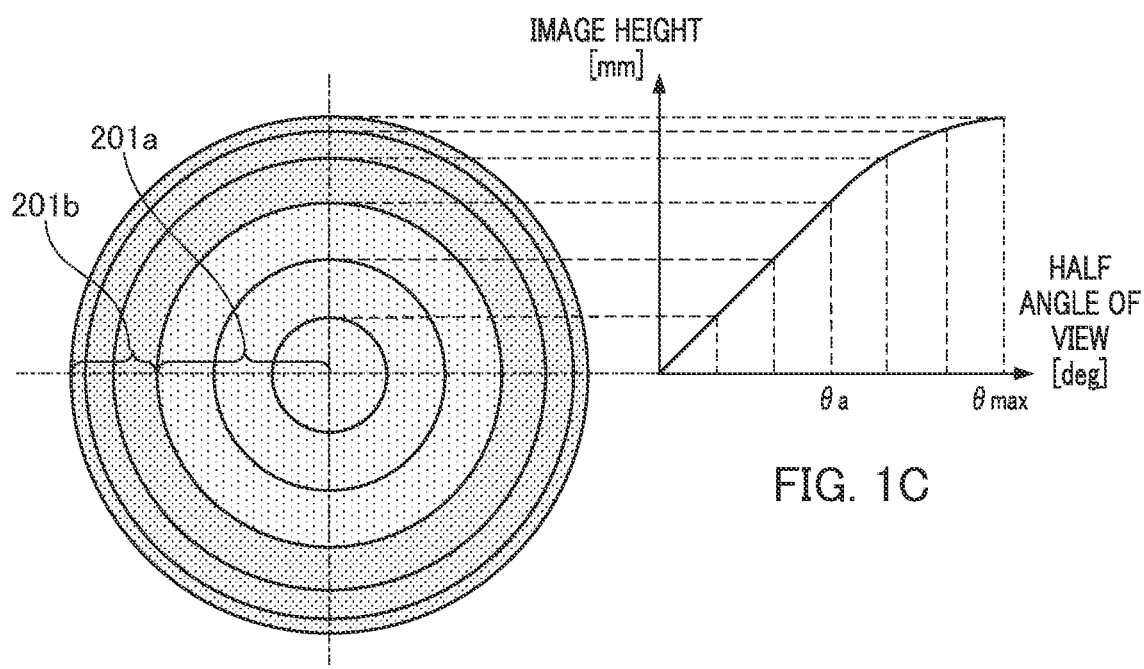
FIG. 1B
FIG. 1C

IMAGE PROCESSING DEVICE, MOVING DEVICE, IMAGE PROCESSING METHOD, AND STORAGE MEDIUM

BACKGROUND OF THE INVENTION

Cross-Reference to Priority Application

This application claims the benefit of Japanese Patent Application No. 2021-177410 filed on Oct. 29, 2021, which is hereby incorporated by reference herein in its entirety.

Field of the Invention

The present invention relates to an image processing device for imaging a side behind a vehicle, a moving device, an image processing method, and a program.

DESCRIPTION OF THE RELATED ART

Japanese Patent Laid-Open No. 2018-74558 describes a method in which a center portion of an image is displayed on a display unit at the time of normal traveling and a wide angle image is displayed on the display unit in order to reduce a feeling of oppression, in a case when the distance to a following vehicle is equal to or less than a threshold value.

However, Japanese Patent Laid-Open No. 2018-74558 has a problem that it is difficult to notice that a dangerous car approaches from a region outside the display unit since switching to the wide angle image is determined on the basis of the distance to a following vehicle displayed inside the display unit.

SUMMARY OF THE INVENTION

In order to solve the above problem, an image processing device according to the present invention includes at least one processor or circuit configured to function as an imaging unit including an optical system that forms an optical image including a low-distortion region and a high-distortion region on a light receiving surface and configured to image a side behind a first moving device (vehicle), an image processing unit configured to generate image data by performing distortion correction on imaged data generated by the imaging unit, a display control unit configured to cause first image data corresponding to the low-distortion region in the image data to be displayed, and a detection unit configured to detect a second moving device that satisfies a predetermined condition from the image data corresponding to a region including the high-distortion region, the display control unit causing second image data including the second moving device corresponding to the high-distortion region to be displayed, in a case when the detection unit detects the second moving device.

Further features of the present invention will become apparent from the following description of embodiments with reference to the attached drawings.

BRIEF DESCRIPTION OF THE DRAWINGS

FIG. 1A is a side view of a moving device and an imaging device system according to a first embodiment, FIG. 1B is a diagram illustrating, as a contour line, an image height y at each half angle of view on a light receiving surface of an imaging element (imaging device) in an optical system 201 according to the first embodiment, and FIG. 1C is a diagram representing projection properties representing a relationship between the image height y and a half angle of view θ of the optical system 201 according to the first embodiment.

DESCRIPTION OF THE EMBODIMENTS

Figure 2:
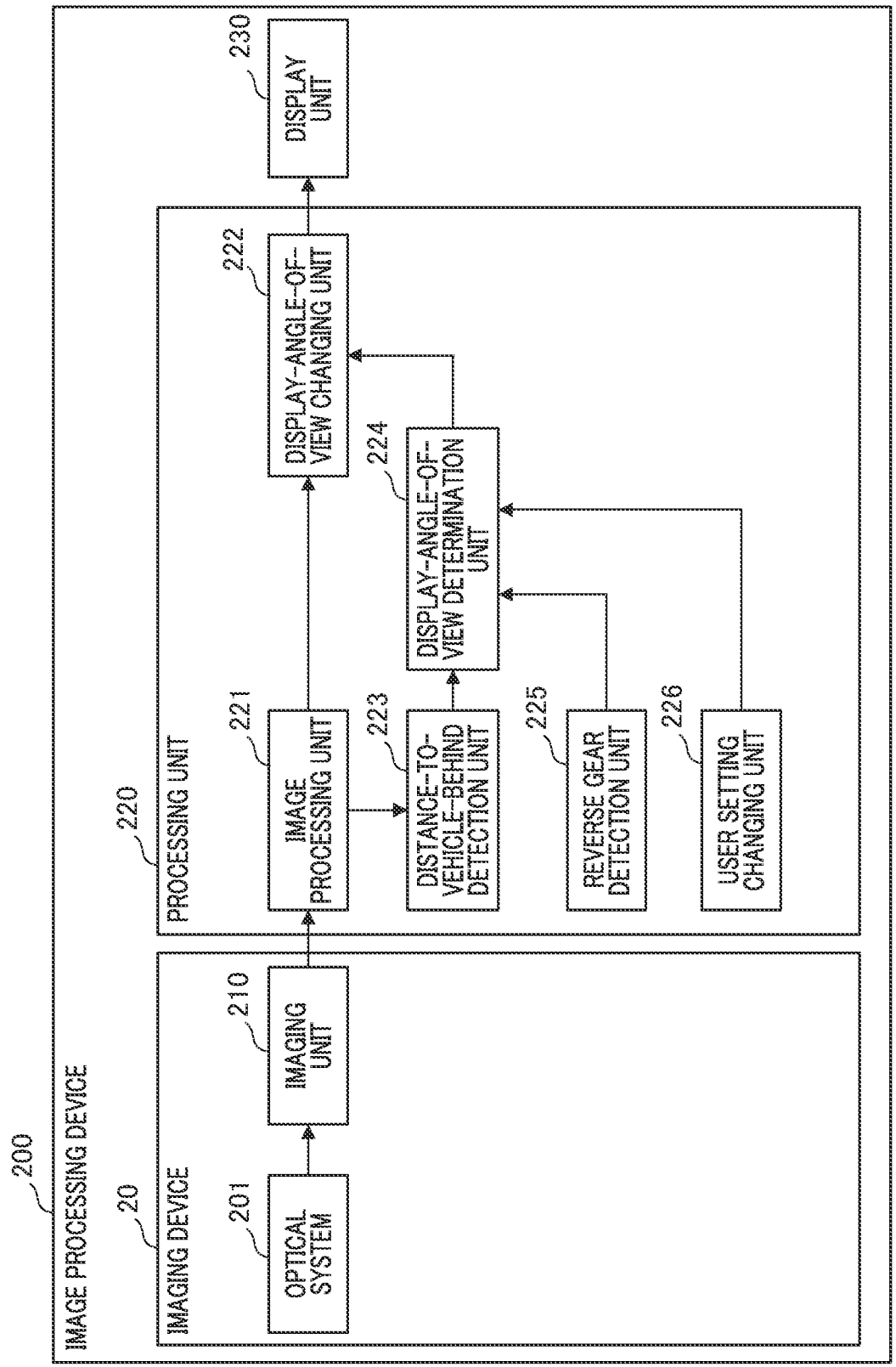
FIG. 2 is a block diagram for explaining a configuration example of an image processing device 200 according to the first embodiment.

Hereafter, with reference to the accompanying drawings, favorable modes of the present invention will be described using Embodiments. In each diagram, the same reference signs are applied to the same members or elements, and duplicate description will be omitted or simplified.

First Embodiment

FIG. 1A is a side view of a moving device and an imaging device system according to a first embodiment. As illustrated in FIG. 1A, an imaging device 20 is mounted on a moving device 10 (first moving device). The moving device 10 described here is a vehicle that travels along roads, such as an automobile, for example, and is able to move to an arbitrary location with a driver 40 on board.

The moving device 10 is provided with an image processing device 200 that includes a drive source, such as an engine or a motor for causing the moving device 10 to move, a drive control unit that controls the drive source, and a display unit for displaying image data captured by the imaging device 20. Also, the moving device is configured to include these components.

An optical system 201 of the imaging device 20 combines a plurality of lenses and causes images of two different angles of view to be formed on a light receiving source of an imaging unit 210. The first angle of view is a narrow angle of view having an ordinary visual field range 30 as an imaging range, high-resolution, and low-distortion. The angle of view is used in a case when the side behind the moving device 10 is observed with high-resolution at the time of ordinary traveling of the moving device 10 or the like.

The other angle of view is a wide angle of view, which has a wide angle visual field range 31 as an imaging range, at which a wider range including the ordinary visual field range 30 is imaged. This angle of view is used to image the side behind the vehicle itself at a wide angle when the moving device 10 travels backward, for example.

An optical property of the optical system 201 will be described with reference to FIGS. 1B and 1C. FIG. 1B is a diagram illustrating, as a contour line, an image height y at each half angle of view on an image plane (a light receiving surface) of an imaging element (imaging device) included in an imaging unit 210.

FIG. 1C is a diagram representing projection properties representing a relationship between the image height y and the half angle of view θ in the optical system 201 according to the first embodiment. FIG. 1C is illustrated with the half angle of view (the angle formed by an optical axis and an incident light beam) θ represented by the horizontal axis and with the formed image height y on the light receiving surface (image surface) of the imaging element (imaging device) included in the imaging unit 210 represented as the vertical axis.

The optical system 201 is configured to have different projection properties y(θ) in a region of less than a predetermined half angle of view θa and a region of not less than the half angle of view θa as illustrated in FIG. 1C. Therefore, a resolution differs depending on the regions when the amount of increase in image height y with respect to the half angle of view θ per unit is referred to as the resolution. It is also possible to state that the local resolution is represented by a differential value dy(θ)/dθ at the half angle of view θ of the projection property y(θ).

For example, it is possible to state that the resolution increases as an inclination of the projection property y(θ) in FIG. 1C increases. Additionally, it is possible to state that the resolution increases as the interval of the image height y at each half angle of view in the form of the contour in FIG. 1B increases.

In the first embodiment, a region near the center generated on the light receiving surface of the imaging element (imaging device) when the half angle of view θ is less than the predetermined half angle of view θa will be referred to as a high-resolution region 201a, while the region near the outside in which the half angle of view θ is equal to or greater than the predetermined angle of view θa will be referred to as a low-resolution region 201b. Note that the angle of view in the high-resolution region 201a corresponds to the aforementioned ordinary visual field range 30 and an angle of view obtained by adding the angle of view in the high-resolution region 201a and the angle of view in the low-resolution region 201b corresponds to the wide angle visual field range 31.

Moreover, in the first embodiment, the high-resolution region 201a is a low-distortion region where the amount of resolution is relatively small, while the low-resolution region 201b is a high-distortion region where the amount of distortion is relatively large. Therefore, the high-resolution region and the low-resolution region may be referred to as a low-distortion region and a high-distortion region, respectively, in the first embodiment.

The optical system 201 is configured such that the projection property y(θ) in the high-resolution region (low-distortion region) 201a is greater than f×θ (f is a focal distance of the optical system 201). Also, the projection property y(θ) in the high-resolution region (low-distortion region) is set to be different from the projection property in the low-resolution region (high-distortion region).

In a case when θ max is assumed to denote the maximum half angle of view that the optical system 201 has, it is desirable that a ratio θa/θ max between θa and θ max be equal to or greater than a predetermined lower limit value, and, for example, it is desirable that the predetermined lower limit value be 0.15 to 0.16. Also, it is desirable that the ratio θa/θma between θa and θ max be equal to or less than a predetermined upper limit value and that the ratio be 0.25 to 0.35, for example.

In a case when θa is 90°, the predetermined lower limit value is 0.15, and the predetermined upper limit value is 0.35, it is desirable that θa be determined within a range of 13.5 to 31.5°.

Furthermore, the optical system 201 is configured such that the projection property y(θ) also satisfies Expression 1 below.

$$1 < \frac{f \times \sin\theta_{max}}{y(\theta_{max})} \le A \qquad \text{[Expression 1]}$$

Here, f denotes the focal distance of the optical system 201 as described above, and A denotes a predetermined constant. It is possible to have a higher central resolution as compared than that of a fisheye lens of an orthographic projection scheme (y=f×sin θ) with the same maximum formed image height by setting the lower limit value to 1, and it is possible to maintain satisfactory optical performance while obtaining an angle of view that is equivalent to that of the fisheye lens by setting the upper limit value to A.

It is only necessary for the predetermined constant A to be determined in consideration of a balance of resolution between the high-resolution region and the low-resolution region, and it is desirable that the predetermined constant A be 1.4 to 1.9.

It is possible to obtain high-resolution in the high-resolution region 201a and to reduce the amount of increase in image height y with respect to the half angle of view θ per unit and to image a wider angle of view in the low-resolution region 201b by configuring the optical system 201 as described above. Therefore, it is possible to obtain a wide angle of view that is equivalent to that of the fisheye lens as an imaging range and to obtain high-resolution in the high-resolution region 201a.

In the first embodiment, a projection property that is approximate to the central projection scheme (y=f×tan θ) or an equidistance projection scheme (y=f×θ), which is a projection property of an optical system for ordinary image capturing is adopted in the high-resolution region (low-distortion region). Therefore, it is possible to achieve fine display with low optical distortion. It is thus possible to obtain a natural sense of perspective when a vehicle behind, or the like, is visually recognized and to obtain satisfactory visibility while curbing degradation of image quality.

Note that, since similar effects can be obtained as long as the projection property y(θ) satisfies the aforementioned condition of Expression 1, the first embodiment is not limited to the projection property illustrated in FIG. 2. Note that, in the first embodiment, the optical system 201 having the projection property y(θ) that satisfies the aforementioned condition of Expression 1 may be referred to as a different-angle-of-view lens.

FIG. 2 is a block diagram for explaining a configuration example of the image processing device 200 according to the first embodiment. Note that one or more components illustrated in FIG. 2 may be implemented by hardware such as an ASIC or a programmable logic array (PLA). The same applies to the block diagrams in FIGS. 4, 6, and 8, which will be described later.

The image processing device 200 is a system that displays, on a display device in a vehicle, an image captured by the imaging device 20 mounted on the rear side of the vehicle. The image processing device 200 includes the imaging device 20, a processing unit 220, and a display unit 230. The imaging device 20 is configured of the optical system 201 and the imaging unit 210 with the configurations described in FIGS. 1B and 1C.

Here, the imaging device 20 functions as an imaging unit, including the optical system 201 that forms an optical image including a low-distortion region and a high-distortion region on the light receiving surface and configured to execute an imaging step of imaging a side behind a first moving device.

The processing unit 220 is configured of an image processing unit 221, a display-angle-of-view determination unit 224, a user setting changing unit 226, a distance-to-vehicle-behind detection unit 223, a reverse gear detection unit 225, and a display-angle-of-view changing unit 222.

Note that a computer (a central processing unit (CPU), a microcomputer, or the like) included in the processing unit 220 functions as a control unit that controls operations of each component in the image processing device 200 on the basis of a computer program stored in a storage medium.

The imaging unit 210 includes an imaging element (a CCD image sensor, a CMOS image sensor, or the like), converts an optical object image formed by the optical system 201 into imaged data, and supplies the imaged data to the image processing unit 221.

The image processing unit 221 performs processing such as wide dynamic range (WDR) correction, gamma correction, look up table (LUT) correction, and distortion correction on the imaged data acquired from the imaging unit 210 and generates image data.

Note that the distortion correction is performed at least on imaged data in the high-distortion region (low-resolution region 201b). In this manner, visibility of the display on the display unit 230 is enhanced, and a recognition rate in the distance-to-vehicle-behind detection unit 223 increases.

Note that the distortion correction may not be performed on imaged data in the low-distortion region (high-resolution region 201a). The image processing unit 221 executes the image processing step as described above, and the thus generated image data is supplied to the display-angle-of-view changing unit 222 and the distance-to-vehicle-behind detection unit 223.

The display-angle-of-view determination unit 224 determines which of the wide angle visual field range 31 and the ordinary visual field range 30 the image to be displayed on the display unit 230 is to have, on the basis of distance information acquired by the distance-to-vehicle-behind detection unit 223, which will be described later, or a detection result of the reverse gear detection unit 225, which will be described later.

Then, a notification is provided to the display-angle-of-view changing unit 222 in accordance with the determination result. For example, the angle of view to be displayed is determined to be the wide angle visual field range 31 in a case when the distance information acquired by the distance-to-vehicle-behind detection unit 223 is equal to or less than a certain threshold value (3 m, for example), and the angle of view to be displayed is determined to be the ordinary visual field range 30 in a case when the distance information is greater than the threshold value.

Also, the angle of view to be displayed is determined to be the wide angle visual field range 31 in a case when a notification indicating that the transmission has been shifted to the reverse gear is provided by the reverse gear detection unit 225, and the angle of view to be displayed is set to be an ordinary range in a case where the transmission has not been shifted to the reverse gear. Furthermore, the angle of view to be displayed is set to the wide angle visual field range 31 regardless of the result obtained by the distance-to-vehicle-behind detection unit 223 in a state when the reverse gear has been detected.

The angle of view to be displayed is determined in accordance with the result obtained by the distance-to-vehicle-behind detection unit 223 in a case when the transmission has not been shifted to the reverse gear. Also, the determination criteria for changing the angle of view may be changed depending on the vehicle model by receiving vehicle model information from the distance-to-vehicle-behind detection unit 223, which will be described later. In a case of a large vehicle such as a truck, for example, the brake distance is longer than that of ordinary vehicles, and the threshold value is thus set to be longer than that for the ordinary vehicles by 10 m, for example.

The user setting changing unit 226 is for allowing the user himself/herself to change the determination criteria on the basis of which determination of whether a change to the wide angle of view is to be performed by the display-angle-of-view determination unit 224 is made. The changed content is input to the display-angle-of-view determination unit 224.

The distance-to-vehicle-behind detection unit 223 acquires the distance of a vehicle behind that is present in image data in a region that does not include the ordinary visual field range 30 in the wide angle visual field range 31, using the image processed by the image processing unit 221.

For example, the distance-to-vehicle-behind detection unit 223 detects a vehicle on the basis of image data other than first image data, which will be described later, in image data in a region including the high-distortion region and calculates the distance between the vehicle itself and the detected vehicle from the position of the detected vehicle, a change in size thereof, and the like. A notification of the distance information calculated by the distance-to-vehicle-behind detection unit 223 is provided to the display-angle-of-view determination unit 224.

Moreover, the distance-to-vehicle-behind detection unit 223 may determine the vehicle type on the basis of data related to image features such as a shape, a color tone, and the like, of each vehicle model extracted as results of machine learning, such as deep learning, from a large number of images of the vehicle collected in advance. Then, the vehicle model information may also be provided as a notification to the display-angle-of-view determination unit 224.

The reverse gear detection unit 225 detects whether the transmission of the vehicle itself has been shifted to the reverse gear. The detection result is provided as a notification to the display-angle-of-view determination unit 224.

The display-angle-of-view changing unit 222 generates an image to be displayed on the display unit 230. In a case when a notification that display of an ordinary visual field range 30 is to be performed is provided to the display-angle-of-view determination unit 224, a rectangular narrow-angle image (first image data) is cut from the ordinary visual field range 30 (low distribution range) in the image data processed by the image processing unit 221, and the narrow angle image is supplied to the display unit 230. In this manner, the display unit 230 is caused to display the first image data.

Also, in a case when a second moving device that satisfies a predetermined condition is detected from the image data in the region including the high-distortion region, second image data including the second moving device in the high-distortion region is caused to be displayed. Note that the second image data may include an image in the low-distortion region.

Here, the display-angle-of-view changing unit 222 includes, as a display control unit, a first display control step of causing the first image data cut from the low-distortion region in the image data to be displayed and a second display control step of causing the second image data to be displayed under a predetermined condition.

The cutting of the image is performed by storing image data processed by the image processing unit 221 in a memory such as a RAM and reading an image to be cut. The position at which the first image data is to be cut is a rectangular region in the ordinary visual field range 30 corresponding to the high-resolution region 201a in the image formed by the optical system 201.

Also, in a case when the second moving device is detected and a notification that the wide angle visual field range 31 is to be displayed is provided to the display-angle-of-view determination unit 224, a rectangular wide angle image (second image data) that is the wide angle visual field range 31, and includes the second moving device, is supplied to the display unit 230. Therefore, the second image data including the second moving device in the high-distortion region is displayed.

The image supplied by the display-angle-of-view changing unit 222 to the display unit 230 is subjected to processing of increasing or reducing the size of the image to achieve a size that is optimal for the size of the display unit 230, and the image is then supplied to the display unit 230. When the display region is switched from the first image data to the second image data, the transition is performed such that the display region is gradually widened over a transition time t1.

Also, when the display region is returned from the second image data to the first image data, the transition is performed such that the display region is gradually narrowed over a transition time t2. For example, the display control unit spends a predetermined transition time for the switching of the display between the first image data and the second image data. Here, the transition time t1 and the transition time t2 are different from each other and satisfy, for example, 0<t1<t2.

Also, in regard to the transition time t1, the time may be changed in accordance with an urgency. When the second moving device suddenly approaching the moving device 10 from the rear side is detected, for example, the transition time t1 is set to be a shorter time. Note that, since it becomes difficult to visually recognize the image on the display unit 230 if satisfaction and non-satisfaction of the condition for switching to the second image data is repeated in a short period of time, it becomes difficult to visually recognize the image on the display unit 230, and a predetermined standby time t3 is thus provided for switching from the second image data to the first image data.

As a setting range of the standby time t3, a time that is longer than zero sec is set. Note that, it is desirable that the condition (threshold value) for switching the display from the second image data to the first image data and the condition (threshold value) for switching the display from the first image data to the second image data be differently set.

The display unit 230 performs display of image data supplied from the display-angle-of-view changing unit 222 that serves as a display control unit, on the display unit such as a liquid crystal display or an organic EL. Also, the display unit 230 is disposed on an upper side of a window shield of the moving device 10, for example, and is used as an electronic rear-view mirror.

Figure 3:
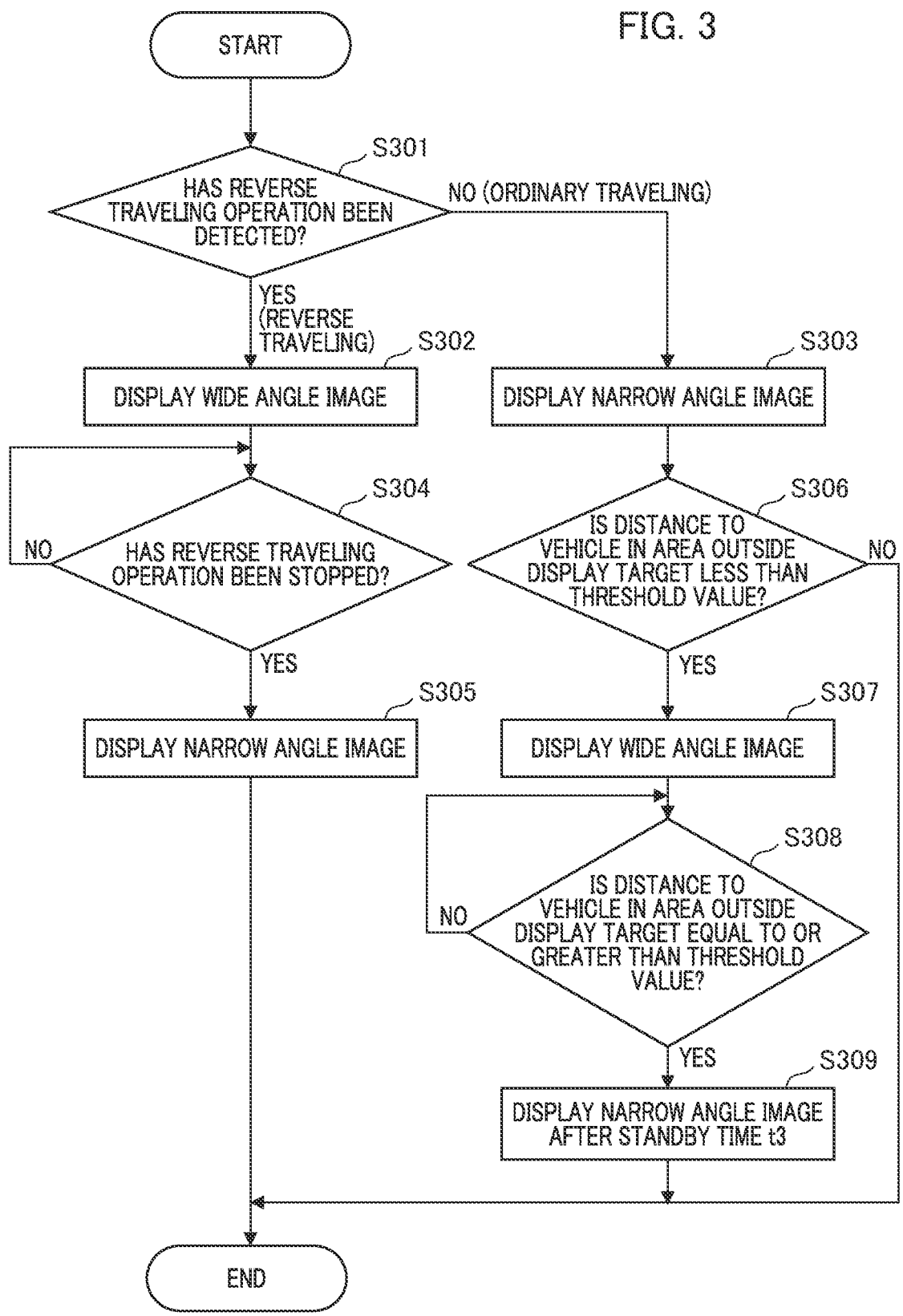
FIG. 3 is a flowchart illustrating an example of an angle-of-view switching processing program executed by a processing unit 220.

FIG. 3 is a flowchart illustrating an example of an angle-of-view switching processing program executed by the processing unit 220. The flow in FIG. 3 is started by a power source of the moving device 10 being brought into an activation state and is continuously executed during driving of the power source. Also, each step illustrated in FIG. 3 is controlled by a computer included in the processing unit 220 executing a computer program stored in the storage medium.

In Step S301, the reverse gear detection unit 225 determines whether or not transmission of the vehicle itself has been shifted to the reverse gear and provides a notification of the determination result to the display-angle-of-view determination unit 224. In a case when it is determined that the transmission of the vehicle itself has been shifted to the reverse gear, the processing proceeds to processing in Step S302. In a case when it is determined that the transmission has not been shifted to the reverse gear, the processing proceeds to processing in Step S303.

In Step S302, the display-angle-of-view changing unit 222 receives a notification of switching to a wide angle image from the display-angle-of-view determination unit 224 and supplies a rectangular wide angle image (third image data), including the wide angle visual field range 31 processed by the image processing unit 221 to the display unit 230. For example, the display-angle-of-view changing unit 222 causes the third image data including the high-distortion region on the side behind the first moving device to be displayed when the first moving device moves backward in Step S302.

Note that the wide angle image of the third image data may have a range that is different from that of the wide angle image of the second image data. The display unit 230 displays the wide angle image (third image data) supplied from the display-angle-of-view changing unit 222 and moves on to Step S304.

In Step S304, the reverse gear detection unit 225 determines whether or not the transmission of the vehicle itself is stilled in the reverse gear and provides a notification of the determination result to the display-angle-of-view determination unit 224. The processing in Step S304 is repeated when the state in which the transmission has been shifted to the reverse gear continues. In a case when the reverse gear is not detected, the processing proceeds to processing in Step S305.

In Step S305, the display-angle-of-view changing unit 222 receives a notification of switching to an ordinary angle-of-view image from the display-angle-of-view determination unit 224 and supplies the rectangular narrow angle image (first image data) cut from the ordinary angle-of-view range in the image processed by the image processing unit 221 to the display unit 230. The display unit 230 displays the narrow angle image (first image data) supplied from the display-angle-of-view changing unit 222 and ends the series of processing.

In Step S303, the display-angle-of-view changing unit 222 receives a notification of changing to the ordinary angle-of-view image from the display-angle-of-view determination unit 224 and supplies the narrow angle image (first image data) obtained by cutting the ordinary angle-of-view range from the image processed by the image processing unit 221 to the display unit 230.

If the display unit 230 is switched to the narrow angle image (first image data) supplied from the display-angle-of-view changing unit 222, then the processing proceeds to Step S306.

In Step S306, the distance-to-vehicle-behind detection unit 223 measures the distance between the vehicle itself and the vehicle behind on the basis of image data, other than the first image data in the image data in the region, including the high-distortion region, and determines whether or not the distance is less than a threshold value (3 m, for example).

In a case when there is a vehicle behind at a distance of less than the threshold value from the vehicle itself, the processing proceeds to Step S307. In this case, Step S306 functions as detection step of detecting the second moving device that satisfies a predetermined condition from the image data in the region including the high-distortion region.

In the first embodiment, the second moving device that satisfies the aforementioned predetermined condition indicates a vehicle on the (obliquely) rear side that is present at a distance of less than the predetermined distance (less than 3 m, for example) from the vehicle itself in the image data other than the first image data in the image data in the region including the high-distortion region.

In a case when the vehicle behind at a distance of equal to or less than the threshold value from the vehicle itself is not present in the image data other than the first image data in the image data in the region including the high-distortion region, it is determined that there is no vehicle on the obliquely rear side. Then, the series of processing is ended as it is without changing the display of the narrow angle image on the display unit 230. The aforementioned threshold value of the distance can be changed by the user using the user setting changing unit 226.

In Step S307, the display-angle-of-view changing unit 222 receives a notification of switching to a wide angle image from the display-angle-of-view determination unit 224 and supplies the wide angle image (second image data), including the second moving device in the high-distortion region to the display unit 230. If the display unit 230 is switched to the wide angle image (second image data) supplied from the display-angle-of-view changing unit 222, then the processing proceeds to Step S308.

In Step S308, the distance between the vehicle itself and the vehicle behind is measured in the image data, other than the first image data in the image data, in the region including the high-distortion region. Then, the display-angle-of-view determination unit 224 determines whether or not the distance is equal to or greater than a threshold value (3 m, for example). For example, whether the distance to the vehicle located obliquely behind is equal to or greater than the predetermined threshold value is determined. In a case when there is a vehicle located obliquely behind, or the like, at a distance of less than the threshold value from the vehicle itself, the processing in Step S308 is repeated.

In a case when the distance between the vehicle itself and the vehicle located obliquely behind is equal to or greater than the threshold value, the processing proceeds to Step S309. The user can also change the threshold value of the distance in Step S308 using the user setting changing unit 226. Moreover, it is also possible to set different values as the threshold value set in Step S306 and the threshold value set in Step S308.

In Step S309, the display-angle-of-view changing unit 222 receives a notification of switching to an ordinary angle-of-view image from the display-angle-of-view determination unit 224 and then keeps the display state of the wide angle image (second image data) in a predetermined standby time t3. After elapse of the standby time t3, the narrow angle image (first image data) is supplied to the display unit 230, the display unit 230 is switched to the narrow angle image (first image data) supplied from the display-angle-of-view changing unit 222, and the series of processing is then ended.

Note that, as described above, the distance-to-vehicle-behind detection unit 223 may be able to detect the type of the second moving device. Additionally, the condition under which the second image data is to be displayed (for example, the threshold value of the distance to the vehicle behind or the like when the vehicle behind is detected as the second moving device) may be differently set in accordance with the type.

Second Embodiment

Figure 4:
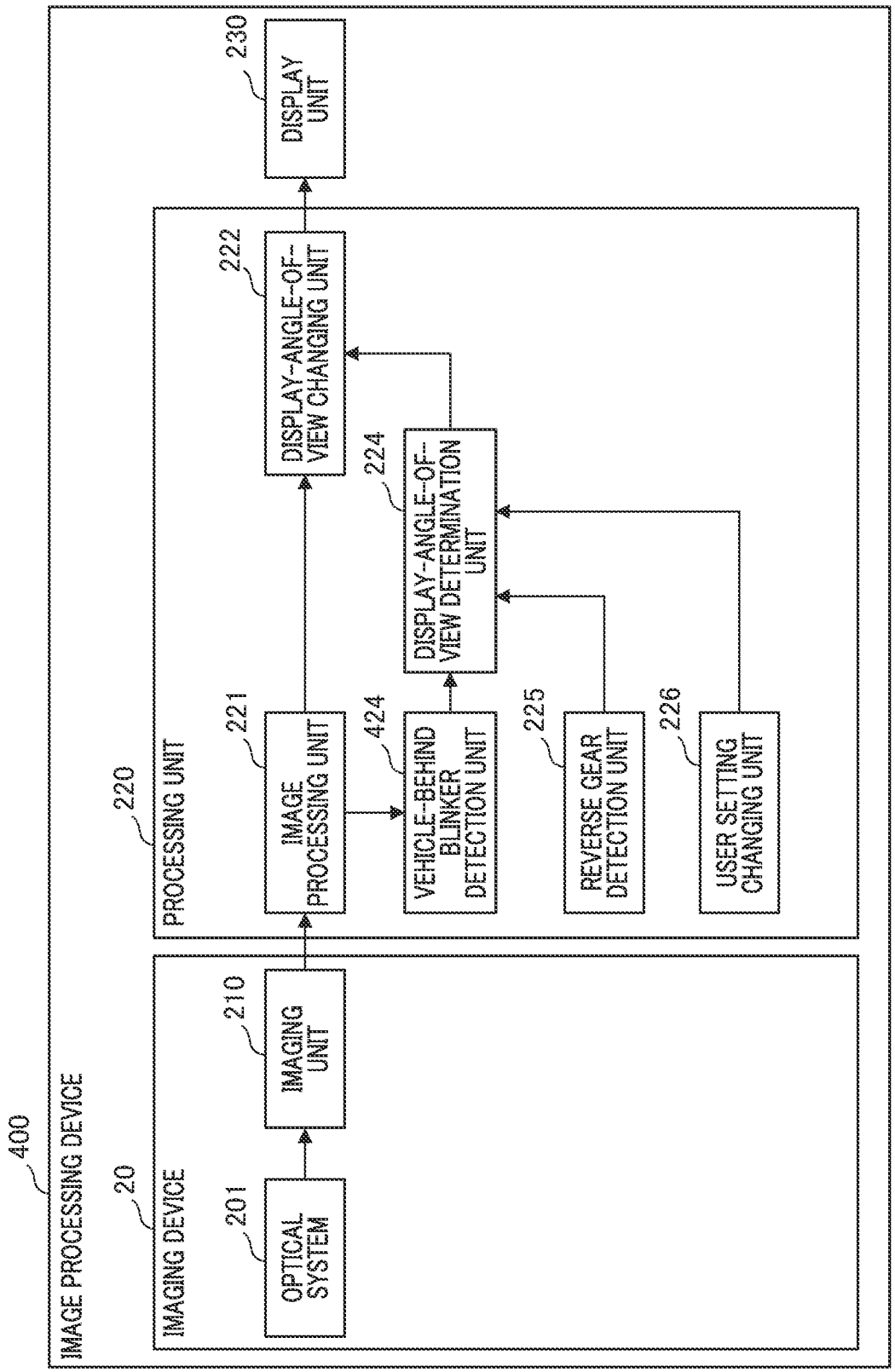
FIG. 4 is a block diagram for explaining a configuration example of an image processing device 400 according to a second embodiment.

FIG. 4 is a block diagram for explaining a configuration example of an image processing device 400 according to a second embodiment. The image processing device 400 is different from the image processing device 200 according to the first embodiment, in that the processing unit 220 includes a vehicle-behind blinker detection unit 424 instead of the distance-to-vehicle-behind detection unit 223. Also, they are different in that the image processed by the image processing unit 221 is supplied to the display-angle-of-view changing unit 222 and the vehicle-behind blinker detection unit 424.

The display-angle-of-view determination unit 224 determines to which of the wide angle visual field range 31 and the ordinary visual field range 30 the image to be displayed on the display unit 230 is to be set, on the basis of the detection information from the vehicle-behind blinker detection unit 424 and the detection information of the reverse gear detection unit 225.

Then, a notification of the determination result is provided to the display-angle-of-view changing unit 222. The angle of view to be displayed is set to the wide angle visual field range 31 (second image data) in a case when a notification that a vehicle turning on its blinker has been detected on the rear side by the vehicle-behind blinker detection unit 424 is provided, and the angle of view to be displayed is set to the ordinary visual field range 30 (first image data) in a case when such a vehicle has not been detected.

Also, the angle of view to be displayed is set to the wide angle visual field range 31 (third image data) in a case when a notification that the transmission has been shifted to the reverse gear is provided from the reverse gear detection unit 225, and the angle of view to be displayed is set to the ordinary visual field range 30 (first image data) in a case when the transmission has not been shifted to the reverse gear.

Moreover, the angle of view to be displayed is set to the wide angle visual field range 31 (third image data) regardless of the result obtained by the vehicle-behind blinker detection unit 424 in a state where the reverse gear has been detected. In a case when the transmission has not been shifted to the reverse gear, the first image data or the second image data is displayed in accordance with the result obtained by the vehicle-behind blinker detection unit 424.

The vehicle-behind blinker detection unit 424 detects a blinker operation of the vehicle behind from the image processed by the image processing unit 221 and provides the detected information as a notification to the display-angle-of-view determination unit 224. Here, the vehicle-behind blinker detection unit 424 detects, as a second moving device, the moving device that is blinking its blinker under a predetermined condition (three or more times in straight, for example).

Figure 5:
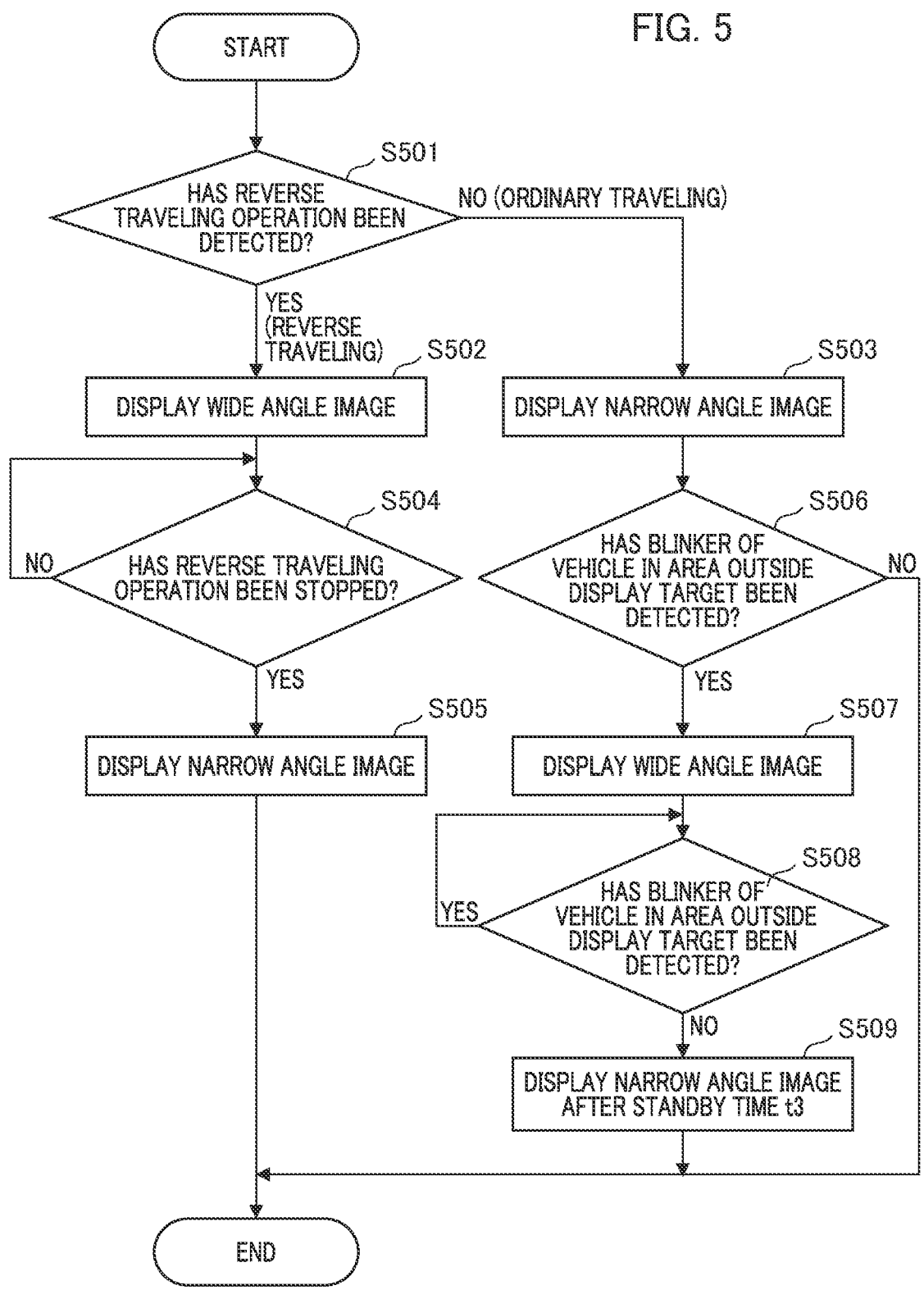
FIG. 5 is a flowchart illustrating an example in which control for changing a display-angle-of-view is performed on the basis of a blinker operation of a vehicle behind according to the second embodiment.

FIG. 5 is a flowchart illustrating an example, in which control of changing the angle of view to be displayed, is performed on the basis of a blinker operation of a vehicle behind in the second embodiment. The flow in FIG. 5 is started by a power source of the moving device 10 being brought into an activation state and is continuously executed during driving of the power source. Also, each step illustrated in FIG. 5 is controlled by a computer included in the processing unit 220 executing a computer program stored in a storage medium.

In Step S501, the reverse gear detection unit 225 determines whether or not the transmission of the vehicle itself has been shifted to the reverse gear and provides a notification to the display-angle-of-view determination unit 224. In a case when it is determined that the transmission of the vehicle itself has been shifted to the reverse gear, the processing proceeds to processing in Step S502. In a case when it is determined that the transmission of the vehicle itself has not been shifted to the reverse gear, the processing proceeds to processing in Step S503.

In Step S502, the display-angle-of-view changing unit 222 receives a notification of switching to a wide angle image from the display-angle-of-view determination unit 224 and supplies the rectangular wide angle image (third image data) to the display unit 230. If the display on the display unit 230 is switched to the wide angle image (third image data) supplied from the display-angle-of-view changing unit 222, then the processing proceeds to Step S504.

In Step S504, the reverse gear detection unit 225 determines whether or not the transmission of the vehicle itself is still in the reverse gear and provides a notification to the display-angle-of-view determination unit 224. The processing in Step S504 is repeated when the state in which the transmission has been shifted to the reverse gear continues. In a case when the reverse gear is not detected, the processing proceeds to Step S505.

In Step S505, the display-angle-of-view changing unit 222 receives a notification of switching to an ordinary angle-of-view image from the display-angle-of-view determination unit 224 and supplies the rectangular narrow angle image (first image data) cut from the ordinary angle-of-view range in the image processed by the image processing unit 221 to the display unit 230. The display unit 230 displays the narrow angle image (first image data) supplied from the display-angle-of-view changing unit 222 and ends the series of processing.

In Step S503, the display-angle-of-view changing unit 222 receives a notification of switching to an ordinary angle-of-view image from the display-angle-of-view determination unit 224 and supplies the narrow angle image (first image data) to the display unit 230. The display unit 230 displays the narrow angle image (first image data) supplied from the display-angle-of-view changing unit 222 and then moves on to Step S506.

In Step S506, the vehicle-behind blinker detection unit 424 detects a vehicle turning on its blinker, in image data other than the first image data, in the image data in the region including the high-distortion region and provides a notification of the detected information to the display-angle-of-view determination unit 224.

In a case when a vehicle turning on its blinker is detected on the side behind the vehicle itself, the processing proceeds to Step S507. In a case when the vehicle turning on its blinker is not detected any more on the side behind the vehicle itself, the series of processing is ended as it is without changing the display of the narrow angle image (first image data) on the display unit 230.

In Step S507, the display-angle-of-view changing unit 222 receives a notification of switching to a wide angle image from the display-angle-of-view determination unit 224 and supplies the rectangular wide angle image (second image data), including the second moving device in the high-distortion region to the display unit 230. If the display unit 230 is switched to the wide angle image (second image data) supplied from the display-angle-of-view changing unit 222, then the processing proceeds to Step S508.

In Step S508, the vehicle-behind blinker detection unit 424 detects a vehicle turning on its blinker in image data other than the first image data in the image data in the region including the high-distortion region. In a case when a vehicle turning on its blinker is detected on the side behind the vehicle itself, the processing in Step S508 is repeated. In a case when the vehicle turning on its blinker is not detected any more on the side behind the vehicle itself, the processing proceeds to Step S509.

In Step S509, the display-angle-of-view changing unit 222 receives a notification of switching to an ordinary angle-of-view image from the display-angle-of-view determination unit 224 and then continuously displays the second image data in the standby time t3. After elapse of the standby time t3, the narrow angle image (first image data) is supplied to the display unit 230, the display unit 230 performs switching to the narrow angle image (first image data) supplied from the display-angle-of-view changing unit 222, and the series of processing is then ended.

Note that the vehicle-behind blinker detection unit 424 detects a vehicle turning on its blinker in the image data, other than the first image data in the image data, in the region including the high-distortion region in Step S506 and Step S508, in the second embodiment. However, the vehicle-behind blinker detection unit 424 may detect a vehicle turning on its blinker in the wide angle visual field range 31 in Step S506 or Step S508.

Third Embodiment

Figure 6:
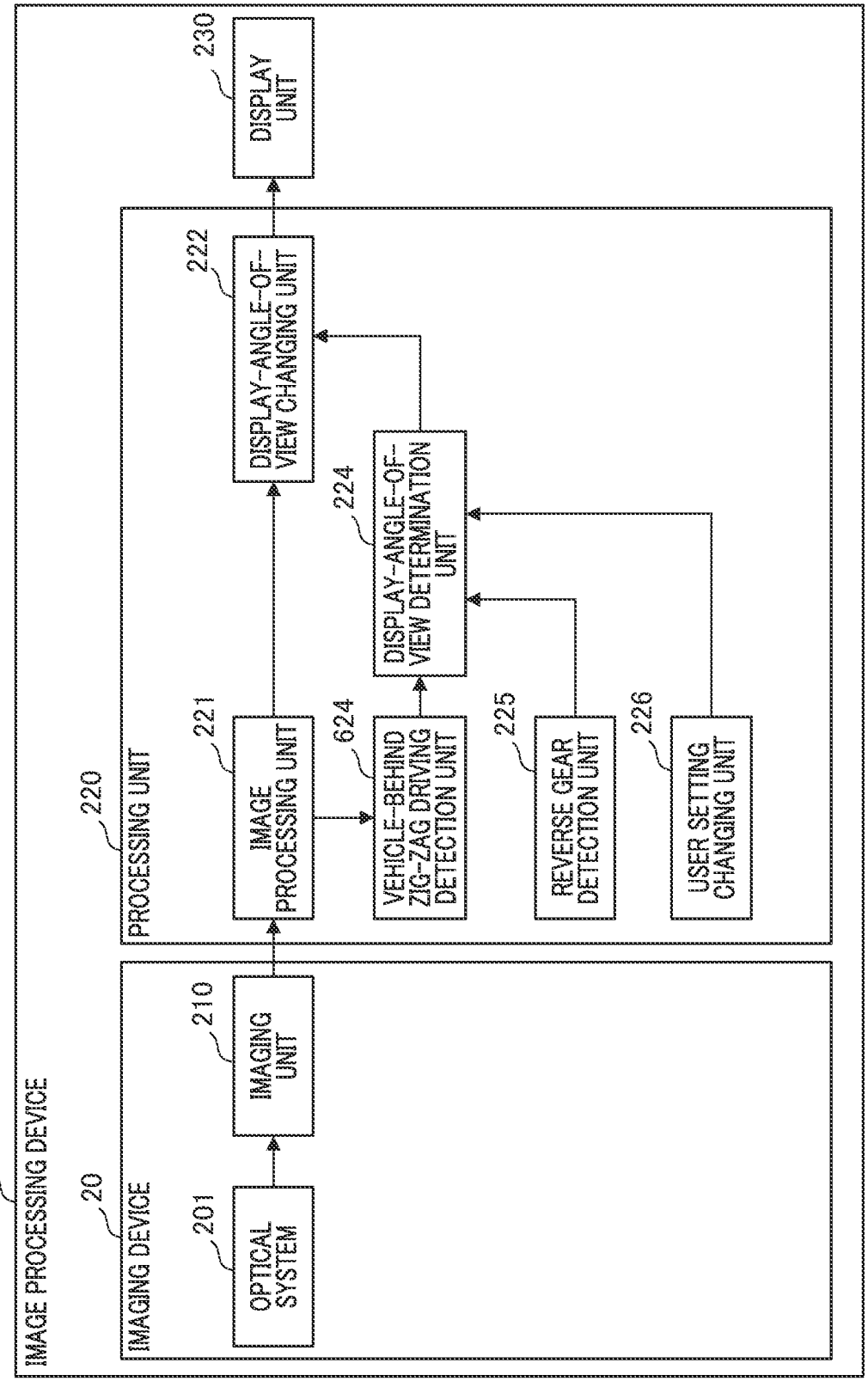
FIG. 6 is a block diagram for explaining a configuration example of an image processing device 600 according to a third embodiment.

FIG. 6 is a block diagram for explaining a configuration example of an image processing device 600 according to a third embodiment. The image processing device 600 is different from the image processing device 200 according to the first embodiment, in that the processing unit 220 includes a zig-zag driving detection unit 624, instead of the distance-to-vehicle-behind detection unit 223 and an image processed by the image processing unit 221 is supplied to the display-angle-of-view changing unit 222 and the zig-zag driving detection unit 624.

The display-angle-of-view determination unit 224 determines which of the wide angle visual field range 31 and the ordinary visual field range 30 is to be set as an image to be displayed on the display unit 230 on the basis of detection information from the zig-zag driving detection unit 624 and a detection result of the reverse gear detection unit 225, and provides a notification of the determination result to the display-angle-of-view changing unit 222.

The second image data is displayed in a case when the number of times of reciprocation the vehicle behind detected by the zig-zag driving detection unit 624 has alternately repeated left-right movement beyond the boundary of a white line is equal to or greater than a threshold value, and the first image data is displayed in a case when the number of times is less than the threshold value.

Also, the third image data is displayed in a case when a notification that the transmission has been shifted to the reverse gear is provided from the reverse gear detection unit 225, and the first image data is displayed in a case when the transmission has not been shifted to the reverse gear.

Furthermore, the third image data is displayed regardless of the result obtained by the zig-zag driving detection unit 624 in a state when the reverse gear has been detected. In a case when the transmission has not been shifted to the reverse gear, the first image data or the second image data is displayed in accordance with the result obtained by the zig-zag driving detection unit 624. Additionally, the determination criteria for changing the angle of view may be changed depending on the vehicle model by receiving vehicle model information from the zig-zag driving detection unit 624, which will be described later.

In a case of a large vehicle such as a truck, for example, a level of risk at the time of collision is high, and the threshold value of the number of times of reciprocation is set to be a smaller value such that it is possible to recognize it earlier than zig-zag driving of ordinary vehicles. For example, the zig-zag driving detection unit 624 may be able to detect the type of the second moving device, and the conditions for displaying the second image data (such as a threshold value of the number of times a boundary between passing sections has been crossed when the vehicle is detected as a zig-zag driving vehicle, for example) may be differently set in accordance with the type.

The zig-zag driving detection unit 624 stores image recognition patterns for detecting various objects in advance and detects a pattern appearing on an image using a predetermined image recognition algorithm on the basis of the image recognition patterns.

The image patterns may be defined through machine learning such as deep learning or may be image recognition patterns limited to objects that may be present on the roads and the surroundings thereof, such as automobiles, motorcycles, pedestrians, objects installed on the roads, lanes, and white lines, which are objects that can be imaged by the imaging device.

The zig-zag driving detection unit 624 detects a vehicle in an image processed by the image processing unit 221 and detects the number of times of a motion in which the detection position alternately repeats left-right movement beyond the boundary of a white line. When the motion of alternately repeating left-right movement beyond the boundary of the white line is detected, a notification of the number of times of the reciprocation is provided to the display-angle-of-view determination unit 224.

The zig-zag driving detection unit 624 holds data regarding image features, such as a shape and a color tone of each vehicle model extracted as a result of machine learning, such as deep learning from images of a large number of vehicles collected in advance, determines the vehicle model, and provides the notification along with the vehicle model information to the display-angle-of-view determination unit 224. Here, the zig-zag driving detection unit 624 functions as a detection unit that detects, as a second moving device, the moving device that repeats the motion of crossing the boundary of the passing sections.

Figure 7:
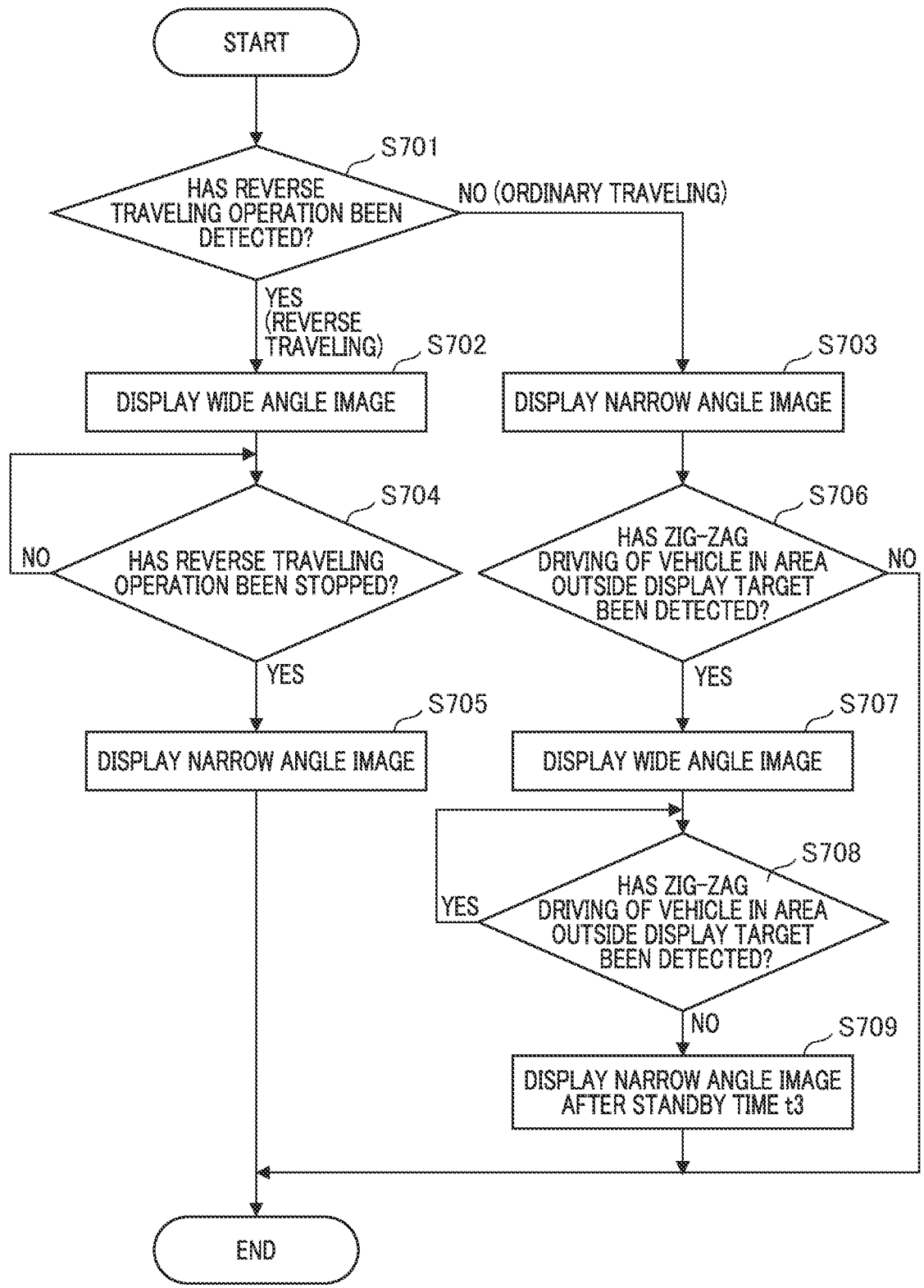
FIG. 7 is a flowchart illustrating an example in which control for detecting zig-zag driving of a vehicle behind and changing a display-angle-of-view is performed according to a fourth embodiment.

FIG. 7 is a flowchart illustrating an example in which control of detecting zig-zag driving of a vehicle behind and changing the angle of view to be displayed is performed in a fourth embodiment. The flow in FIG. 7 is started by the power source of the moving device 10 being brought into an activation state and is continuously executed during driving of the power source. Also, each step illustrated in FIG. 7 is controlled by the computer included in the processing unit 220 executing the computer program stored in the storage medium.

In Step S701, the reverse gear detection unit 225 determines whether or not the transmission of the vehicle itself has been shifted to the reverse gear and provides a notification to the display-angle-of-view determination unit 224. In a case when it is determined that the transmission of the vehicle itself has been shifted to the reverse gear, the processing proceeds to Step S702. In a case when it is determined that the transmission has not been shifted to the reverse gear, the processing proceeds to Step S703.

In Step S702, the display-angle-of-view changing unit 222 receives a notification of switching to a wide angle image from the display-angle-of-view determination unit 224 and supplies the wide angle image (third image data) to the display unit 230. If the display on the display unit 230 is switched to the wide angle image (third image data) supplied from the display-angle-of-view changing unit 222, the processing proceeds to Step S704.

In Step S704, the reverse gear detection unit 225 determines whether or not the transmission is still in the reverse gear and provides a notification to the display-angle-of-view determination unit 224. The processing in Step S704 is repeated when the state in which the transmission has been shifted to the reverse gear continues. In a case when the reverse gear is not detected any more, the processing proceeds to processing in Step S705.

In Step S705, the display-angle-of-view changing unit 222 receives a notification of switching to an ordinary angle-of-view image from the display-angle-of-view determination unit 224 and supplies the rectangular narrow angle image (first image data) cut from an ordinary angle-of-view range in the image processed by the image processing unit 221 to the display unit 230. The display unit 230 displays the narrow angle image (first image data) supplied from the display-angle-of-view changing unit 222 and ends the series of processing.

In Step S703, the display-angle-of-view changing unit 222 receives a notification of switching to an ordinary angle-of-view image from the display-angle-of-view determination unit 224 and supplies the narrow angle image (first image data) to the display unit 230. If the display on the display unit 230 is switched to the narrow angle image (first image data) supplied from the display-angle-of-view changing unit 222, the processing proceeds to Step S706.

In Step S706, the zig-zag driving detection unit 624 detects the number of times of reciprocation the detected vehicle has repeated left-right movement beyond the boundary of a white line (or a yellow line, or the like), for example, as a boundary line of lanes in image data other than the first image data in the image data in the region including the high-distortion region. Then, a notification of the detected information is provided to the display-angle-of-view determination unit 224.

In a case when the number of times of reciprocation the detected vehicle has alternately repeated the left-right movement beyond the boundary of the white line exceeds a threshold value (for example, the number of times of reciprocation is two), it is determined as zig-zag driving, and the processing proceeds to Step S707. In a case when the number of times of reciprocation the detected vehicle has alternately repeated left-right movement beyond the boundary of the white line does not exceed the threshold value, the series of processing is ended as it is without changing the display of the narrow image (first image data) on the display unit 230.

In Step S707, the display-angle-of-view changing unit 222 receives a notification of switching to a wide angle image from the display-angle-of-view determination unit 224 and supplies the wide angle image (second image data) to the display unit 230. For example, the second image data that is a wide angle image, including the second moving device in the high-distortion region, is supplied to the display unit 230. If the display unit 230 is switched to the wide angle image (second image data) supplied from the display-angle-of-view changing unit 222, the processing proceeds to Step S708.

In Step S708, the zig-zag driving detection unit 624 detects the number of times of reciprocation the detected vehicle has alternately repeated the left-right movement beyond the boundary of the white line, for example, in image data other than the first image data in the image data in the region including the high-distortion region. Then, a notification of the detected information is provided to the display-angle-of-view determination unit 224.

In a case when the number of times of reciprocation that the detected vehicle has alternately repeated left-right movement beyond the boundary of the white line, for example, exceeds a threshold value (the number of times of the reciprocation is two, for example), it is determined as zig-zag driving, and the processing in Step S708 is repeated. In a case when the number of times of reciprocation the detected vehicle has alternately repeated the left-right movement beyond the boundary of the white line, for example, does not exceed the threshold value, the processing proceeds to Step S709.

In Step S709, the display-angle-of-view changing unit 222 receives a notification of switching to an ordinary angle-of-view image from the display-angle-of-view determination unit 224 and then continuously displays the second image data in the standby time t3. After elapse of the standby time t3, the narrow angle image (first image data) is supplied to the display unit 230, and if the display unit 230 is switched to the narrow angle image (first image data) supplied from the display-angle-of-view changing unit 222, then the series of processing is ended.

Note that, in Step S706 and Step S708 in the third embodiment, the number of times of reciprocation the detected vehicle has alternately repeated movement beyond the boundary of the boundary line of lanes is detected in the image data other than the first image data in the image data in the region including the high-distortion region, and the zig-zag driving vehicle is thus detected.

However, in Step S506 and Step S508, the number of times of reciprocation the detected vehicle has alternately repeated left-right movement beyond the boundary of the boundary lines of lanes may be detected in the wide angle visual field range 31, and the zig-zag driving vehicle may thus be detected accordingly.

Fourth Embodiment

Figure 8:
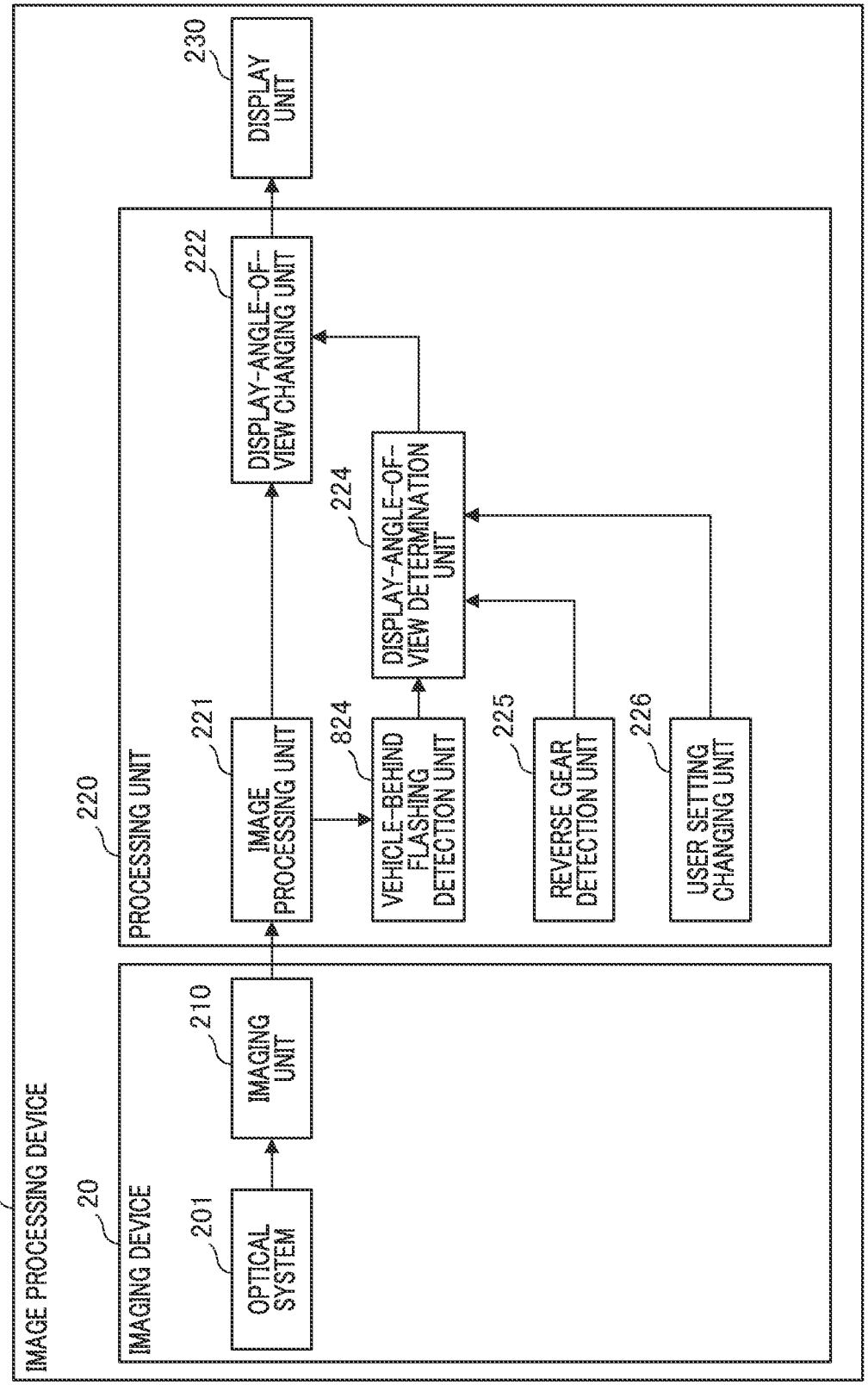
FIG. 8 is a block diagram for explaining a configuration example of an image processing device 800 according to the fourth embodiment.

FIG. 8 is a block diagram for explaining a configuration example of an image processing device 800 according to a fourth embodiment. The image processing device 800 is different from the image processing device 200 according to the first embodiment in that the processing unit 220 includes a vehicle-behind headlight flashing detection unit 824 instead of the distance-to-vehicle-behind detection unit 223.

Also, they are different in that the image processed by the image processing unit 221 is supplied to the display-angle-of-view changing unit 222 and the vehicle-behind headlight flashing detection unit 824.

The display-angle-of-view determination unit 224 determines to which of the wide angle visual field range 31 and the ordinary visual field range 30 an image to be displayed on the display unit 230 is to be set, on the basis of detection information from the vehicle-behind headlight flashing detection unit 824 and a detection result of the reverse gear detection unit 225. Then, a notification of the determination result is provided to the display-angle-of-view changing unit 222. The second image data is displayed in a case when the vehicle-behind headlight flashing detection unit 824 detects a vehicle flashing its headlight on the rear side, and the first image data is displayed in a case when the vehicle is not detected.

Also, the third image data is displayed in a case when a notification that the transmission has been shifted to the reverse gear is provided from the reverse gear detection unit 225, and the first image data is displayed in a case when the transmission has not been shifted to the reverse gear.

Moreover, the third image data is displayed regardless of the result obtained by the vehicle-behind headlight flashing detection unit 824 in a state where the reverse gear has been detected. In the case when the transmission has not been shifted to the reverse gear, the first image data or the second image data is displayed in accordance with the result obtained by the vehicle-behind headlight flashing detection unit 824.

The vehicle-behind headlight flashing detection unit 824 detects headlight flashing motion of the vehicle behind in the image processed by the image processing unit 221 and provides a notification of the detected information to the display-angle-of-view determination unit 224. Here, the vehicle-behind headlight flashing detection unit 824 functions as a detection unit that detects, as a second moving device, the moving device that is performing the headlight flashing motion.

Figure 9:
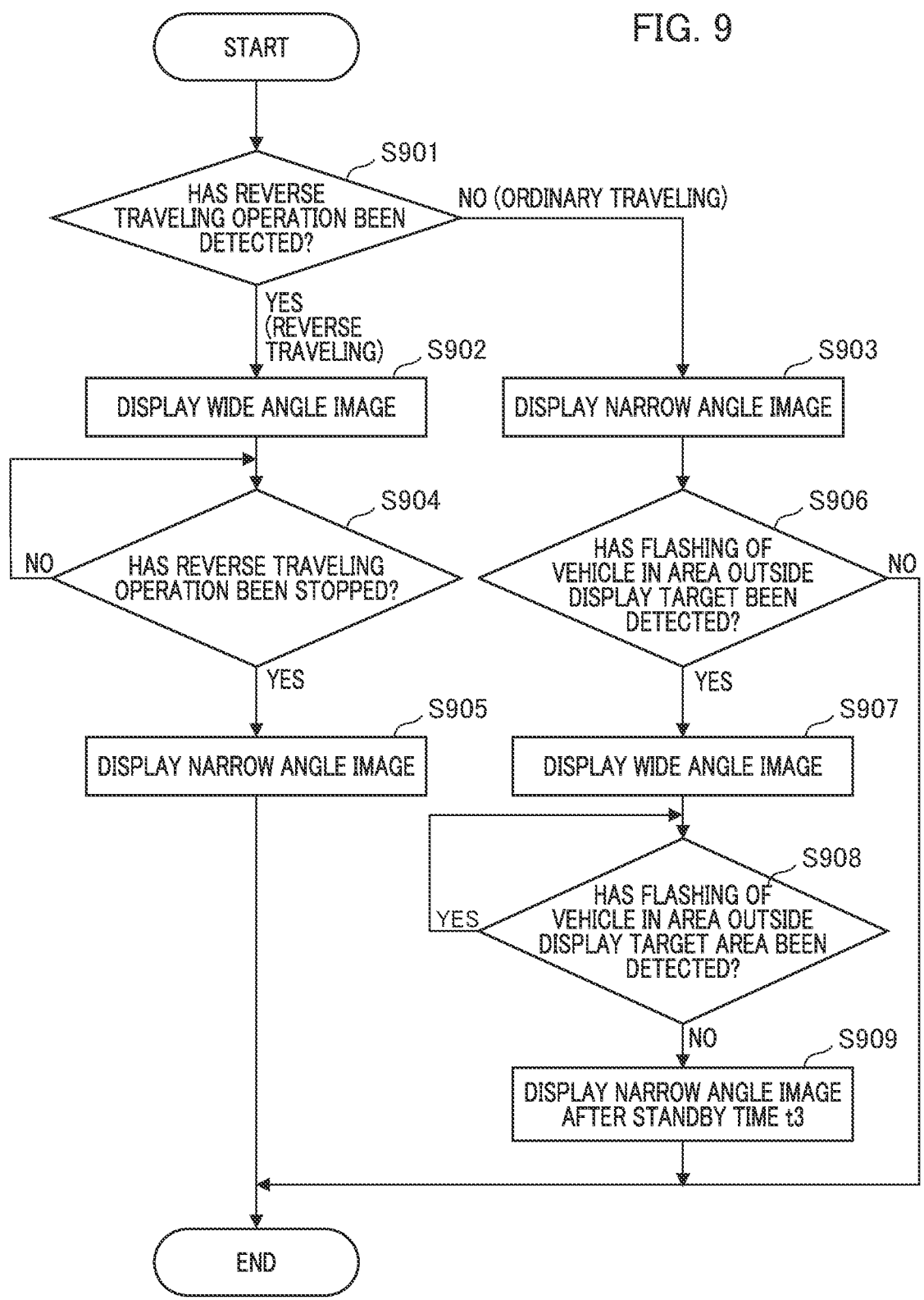
FIG. 9 is a flowchart illustrating an example in which control for detecting a headlight flashing operation of a vehicle behind and changing a display-angle-of-view is performed according to the fourth embodiment.

FIG. 9 is a flowchart illustrating an example in which control of detecting the headlight flashing motion of the vehicle behind and changing the angle of view to be displayed is performed in the fourth embodiment. The flow in FIG. 9 is started by the power source of the moving device 10 being brought into an activation state and is continuously executed during driving of the power source. Also, each step illustrated in FIG. 9 is controlled by the computer included in the processing unit 220 executing the computer program stored in the storage medium.

In Step S901, the reverse gear detection unit 225 determines whether or not the transmission of the vehicle itself has been shifted to the reverse gear and provides a notification to the display-angle-of-view determination unit 224. In a case when it is determined that the transmission of the vehicle itself has been shifted to the reverse gear, the processing proceeds to processing in Step S902. In a case when it is determined that the transmission has not been shifted to the reverse gear, the processing proceeds to processing in Step S903.

In Step S902, the display-angle-of-view changing unit 222 receives a notification of switching to a wide angle image from the display-angle-of-view determination unit 224 and supplies the wide angle image (third image data) to the display unit 230. If the display on the display unit 230 is switched to the wide angle image (third image data) supplied from the display-angle-of-view changing unit 222, then the processing proceeds to Step S904.

In Step S904, the reverse gear detection unit 225 determines whether or not the transmission of the vehicle itself is still in the reverse gear and provides a notification to the display-angle-of-view determination unit 224. The processing in Step S904 is repeated when the state in which the transmission has been shifted to the reverse gear continues. In a case when the reverse gear is not detected any more, the processing proceeds to Step S905.

In Step S905, the display-angle-of-view changing unit 222 receives a notification of switching to an ordinary angle-of-view image from the display-angle-of-view determination unit 224 and supplies the rectangular narrow angle image (first image data) obtained by cutting the ordinary angle-of-view range from the image processed by the image processing unit 221 to the display unit 230. The display unit 230 displays the narrow angle image (first image data) supplied from the display-angle-of-view changing unit 222 and ends the series of processing.

In Step S903, the display-angle-of-view changing unit 222 receives a notification of switching to an ordinary angle-of-view image from the display-angle-of-view determination unit 224 and supplies the narrow angle image (first image data) to the display unit 230. If the display on the display unit 230 is switched to the narrow angle image (first image data) supplied from the display-angle-of-view changing unit 222, then the processing proceeds to Step S906.

In Step S906, the vehicle-behind headlight flashing detection unit 824 detects a vehicle flashing its headlight in image data other than the first image data in the image data in the region including the high-distortion region and provides a notification of the detected information to the display-angle-of-view determination unit 224.

In a case when the vehicle flashing its headlight is detected on the side behind the vehicle itself, the processing proceeds to Step S907. In a case when the vehicle flashing its headlight is not detected on the side behind the vehicle itself, the series of processing is ended as it is without changing the display of the narrow angle image (first image data) on the display unit 230.

In Step S907, the display-angle-of-view changing unit 222 receives a notification of switching to a wide angle image from the display-angle-of-view determination unit 224 and supplies the wide angle image (second image data) to the display unit 230. For example, the second image data, which is a wide angle image including the second moving device in the high-distortion region, is supplied to the display unit 230. If the display unit 230 is switched to the wide angle image (second image data) supplied from the display-angle-of-view changing unit 222, then the processing proceeds to Step S908.

In Step S908, the vehicle-behind headlight flashing detection unit 824 detects the vehicle flashing its headlight in image data other than the first image data in the image data in the region including the high-distortion region and provides a notification of the detected information to the display-angle-of-view determination unit 224. In a case when the vehicle flashing its headlight is detected on the side behind the vehicle itself, the processing in Step S908 is repeated. In a case when the vehicle flashing its headlight is not detected any more on the side behind the vehicle itself, the processing proceeds to Step S909.

In Step S909, the display-angle-of-view changing unit 222 receives a notification of switching to an ordinary angle-of-view image from the display-angle-of-view determination unit 224 and then continuously displays the second image data in the standby time t3. After elapse of the standby time t3, the narrow angle image (first image data) is supplied to the display unit 230. If the display unit 230 is switched to the narrow angle image (first image data) supplied from the display-angle-of-view changing unit 222, then the series of processing is ended.

Note that, in Step S906 and Step S908 in the fourth embodiment, the vehicle flashing its headlight is detected in image data other than the first image data in the image data in the region including the high-distortion region. However, a vehicle flashing its headlight may be detected in the wide angle visual field range 31, and the vehicle flashing its headlight may thus be detected in Step S506 and Step S508.

Fifth Embodiment

The moving devices (vehicles) 10 in the aforementioned first to fourth embodiments are not limited to automobiles and may be any device as long as it is possible to move, such as a motorcycle, a bicycle, a wheelchair, a ship, an airplane, a robot, or a drone.

Sixth Embodiment

At least one of the various functions, processing, and methods described in the aforementioned embodiments can be implemented using a program. Hereafter, the program for implementing at least one of the various functions, processing, and methods described in the aforementioned embodiments will be referred to as a "program X" in a sixth embodiment.

Furthermore, a computer for implementing the program X will be referred to as a "computer Y" in the sixth embodiment. A personal computer, a microcomputer, a central processing unit (CPU), and the like, are examples of the computer Y The computer such as the image processing device, or the like, in the aforementioned embodiments is also an example of the computer Y.

At least one of the various functions, processing, and methods described in the aforementioned embodiments can be implemented by the computer Y executing the program X. In this case, the program X is supplied to the computer Y via a computer readable storage medium.

The computer readable storage medium in the sixth embodiment includes at least one of a hard disk device, a magnetic storage device, an optical storage device, a magneto-optical storage device, a memory card, a ROM, and a RAM. Moreover, the computer readable storage medium in the sixth embodiment is a non-transitory storage medium.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

What is claimed is:
1. An image processing device comprising:
at least one processor or circuit configured to function as:
an imaging unit including an optical system that forms an optical image including a low-distortion region and a high-distortion region on a light receiving surface and configured to image a side behind a first moving device;
an image processing unit configured to generate image data by performing distortion correction on imaged data generated by the imaging unit;
a detection unit configured to detect a second moving device that satisfies a predetermined condition from the image data corresponding to a region including the high-distortion region; and a display control unit configured to display narrow angle image data corresponding to the low-distortion region in the image data in a case when the detection unit does not detect the second moving device, and to display wide angle image data corresponding to the low-distortion region and the high-distortion region, in a case when the detection unit detects the second moving device, so that the wide angle image data including the second moving device is displayed.

2. The image processing device according to claim 1, wherein, in a case when a focal distance of the optical system is defined as f, a half angle of view is defined as $\theta$, an image height on an image plane is defined as y, and a projection property representing a relationship between the image height y and the half angle of view $\theta$ is defined as y($\theta$), y($\theta$) in the low-distortion region is greater than f×$\theta$ and is different from the projection property in the high-distortion region.

3. The image processing device according to claim 2, wherein the low-distortion region is configured to have a projection property that is approximate to a central projection method, wherein y=f×tan $\theta$, or an equidistance projection method, wherein y=y×$\theta$.

4. The image processing device according to claim 2, wherein, in a case when $\theta$ max is defined as a maximum half angle of view that the optical system has, the image processing device is configured to satisfy:

$$1 < f \times \sin(\theta \max)/y(\theta \max) \leq 1.9.$$

5. The image processing device according to claim 1, wherein the display control unit causes third image data, including the high-distortion region on a side behind the first moving device, to be displayed when the first moving device moves backward.

6. The image processing device according to claim 1, wherein the detection unit detects, as the second moving device, a moving device that is present at a distance that is less than a predetermined distance from the first moving device in the image data other than the narrow angle image data, the image data being the image data in the region including the high-distortion region.

7. The image processing device according to claim 1, wherein the detection unit detects, as the second moving device, a moving device that is blinking its blinker under a predetermined condition.

8. The image processing device according to claim 1, wherein the detection unit detects, as the second moving device, a moving device that repeats a motion of crossing a boundary of passing sections.

9. The image processing device according to claim 1, wherein the detection unit detects, as the second moving device, a moving device that is performing a headlight flashing motion.

10. The image processing device according to claim 1, wherein the display control unit causes a predetermined transition time to be spent when display of the narrow angle image data and the wide angle image data is switched.

11. The image processing device according to claim 10, wherein the transition time when display is switched from the narrow angle image data to the wide angle image data, and the transition time when display is switched from the wide angle image data to the narrow angle image data, are different from each other.

12. The image processing device according to claim 1, wherein the detection unit is able to detect a type of the second moving device, and the display control unit causes a condition under which the wide angle image data is displayed to be different, depending on the type.

13. A moving device comprising:

at least one processor or circuit configured to function as:

an imaging unit including an optical system that forms an optical image including a low-distortion region and a high-distortion region on a light receiving surface and configured to image a side behind a first moving device;

an image processing unit configured to generate image data by performing distortion correction on imaged data generated by the imaging unit;

a detection unit configured to detect a second moving device that satisfies a predetermined condition from the image data corresponding to a region including the high-distortion region;

a display control unit configured to display narrow angle image data corresponding to the low-distortion region in the image data in a case when the detection unit does not detect the second moving device, and to display wide angle image data corresponding to the low-distortion region and the high-distortion region, in a case when the detection unit detects the second moving device, so that the wide angle image data including the second moving device is displayed;

a display unit configured to have display controlled by the display control unit; and a drive unit configured to cause the first moving device to move.

14. An image processing method comprising:

an imaging step of imaging a side behind a first moving device using an imaging unit that includes an optical system configured to form an optical image including a low-distortion region and a high-distortion region on a light receiving surface;

an image processing step of generating image data by performing distortion correction on imaged data acquired in the imaging step;

a detecting step of detecting a second moving device that satisfies a predetermined condition from the image data corresponding to a region including the high-distortion region; and a display control step of causing narrow angle image data corresponding to the low-distortion region in the image data to be displayed in a case when the detection unit does not detect the second moving device, and causing wide angle image data corresponding to the low-distortion region and the high-distortion region to be displayed, in a case when the detection unit detects the second moving device, so that the wide angle image data including the second moving device is displayed.

15. A non-transitory computer-readable storage medium configured to store a computer program comprising instructions for executing the following processes:

an imaging step of imaging a side behind a first moving device using an imaging unit that includes an optical system configured to form an optical image including a low-distortion region and a high-distortion region on a light receiving surface;

an image processing step of generating image data by performing distortion correction on imaged data acquired in the imaging step;

a detecting step of detecting a second moving device that satisfies a predetermined condition from the image data corresponding to a region including the high-distortion region; and a display control step of causing narrow angle image data corresponding to the low-distortion region in the image data to be displayed in a case when the detection unit does not detect the second moving device, and causing wide angle image data corresponding to the low-distortion region and the high-distortion region to be displayed, in a case when the detection unit detects the second moving device, so that the wide angle image data including the second moving device is displayed.

* * * * *